(12) United States Patent
Han et al.

(10) Patent No.: US 11,995,850 B2
(45) Date of Patent: May 28, 2024

(54) IMAGE PROCESSING SYSTEM AND IMAGE PROCESSING METHOD

(71) Applicant: SK hynix Inc., Icheon-si (KR)

(72) Inventors: Ji Hee Han, Icheon-si (KR); Jong Heon Kim, Icheon-si (KR); Ju Hyun Cho, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/945,841

(22) Filed: Sep. 15, 2022

(65) Prior Publication Data

US 2023/0353884 A1    Nov. 2, 2023

(30) Foreign Application Priority Data

Apr. 27, 2022  (KR) .................. 10-2022-0052071

(51) Int. Cl.
*G06T 7/50*    (2017.01)
(52) U.S. Cl.
CPC ...... *G06T 7/50* (2017.01); *G06T 2207/10024* (2013.01)
(58) Field of Classification Search
CPC ........ H04N 23/80; H04N 23/54; H04N 23/64; H04N 25/11; H04N 25/705; H04N 25/771; H04N 25/745; G06T 2207/10024; G06T 7/50
USPC ........ 348/471, 207.99, 207.1, 207.11, 222.1; 382/254, 274, 106
See application file for complete search history.

(56) References Cited

U.S. PATENT DOCUMENTS

| | | | |
|---|---|---|---|
| 8,976,283 B2 | 3/2015 | Ishiwata et al. | |
| 2015/0381869 A1* | 12/2015 | Mlinar | H04N 25/134 348/222.1 |
| 2019/0155302 A1 | 5/2019 | Lukierski et al. | |
| 2019/0295282 A1 | 9/2019 | Smolyanskiy et al. | |
| 2020/0051266 A1 | 2/2020 | Claret et al. | |

FOREIGN PATENT DOCUMENTS

KR    102232524 B1    3/2021

* cited by examiner

*Primary Examiner* — Sherrie Hsia
(74) *Attorney, Agent, or Firm* — WILLIAM PARK & ASSOCIATES LTD.

(57) ABSTRACT

An image processing device comprises a data group generator, a gradient value manager, and a cost volume manager. The data group generator is configured to receive pixel values of an image that include phase and brightness information, and determine data groups indicating disparity of the image based on target pixel values, where the data groups correspond to a range that is determined according to the phase information. The gradient value manager is configured to determine gradient values of a region corresponding to the target pixel values and determine gradient information. The gradient information is determined by applying threshold values to the gradient values, where the threshold values are determined according to the target pixel values. The cost volume manager is configured to determine a cost volume by weighted summing the data groups based on the gradient information.

20 Claims, 11 Drawing Sheets

IMAGE PROCESSING SYSTEM AND IMAGE PROCESSING METHOD

CROSS-REFERENCE TO RELATED APPLICATION

The present application claims priority under 35 U.S.C. § 119(a) to Korean patent application number 10-2022-0052071, filed on Apr. 27, 2022, in the Korean Intellectual Property Office, the entire disclosure of which is incorporated herein by reference.

BACKGROUND

1. Technical Field

Various embodiments of the present disclosure generally relate to an image processing system, and more particularly, to an image processing system and an image processing method for manipulating pixel information.

2. Related Art

Image sensors may be classified into charge-coupled device (CCD) image sensors and complementary metal-oxide semiconductor (CMOS) image sensors. The CMOS image sensors may generally have lower manufacturing cost, lower power consumption, and easier integration with a peripheral circuit than CCD image sensors.

Image sensors included in a smartphone, a tablet PC, a digital camera, and the like, may obtain image information of an external object by converting light reflected from the external object into an electrical signal. Image signal processing devices may perform operations to convert the obtained electrical signals to improve image quality.

The image signal processing devices may improve image quality by performing an image processing operation. Generally, image processing may result in higher definition when using a plurality of images from a plurality of cameras than when using a single image from a single camera.

SUMMARY

According to an embodiment, an image processing device may include a data group generator configured to receive pixel values including phase information and brightness information of an image from a device external to the image processing device and deter mine data groups based on target pixel values, wherein the data groups correspond to a range that is determined according to the phase information. The image processing device may also include a gradient value manager configured to determine gradient values of a region corresponding to the target pixel values and determine gradient information by applying threshold values to the gradient values, wherein the threshold values are determined according to the target pixel values. The image processing device may additionally include a cost volume manager configured to determine a cost volume by weighted summing the data groups based on the gradient information.

According to an embodiment, an image processing system may include an image sensor configured to determine pixel values including phase information and brightness information of an image based on light received from outside, and an image processing device configured to obtain depth information of the image based on the pixel values received from the image sensor. The image sensor may include microlenses, where each of the microlenses may correspond to n square pixels, where n is an integer greater than one. The image processing device may comprise a data group generator configured to determine data groups based on target pixel values, which may correspond to a range determined according to the phase information, among the pixel values, a gradient value manager configured to determine gradient values of a region corresponding to the target pixel values and determine gradient information by applying threshold values, which are determined according to the target pixel values, to the gradient values, and a cost volume manager configured to determine a cost volume by weighted summing the data groups based on the gradient information and deter mine the depth information based on the cost volume.

According to an embodiment, an image processing method may include receiving pixel values including brightness information and phase information of an image from outside, determining data groups based on target pixel values, which may correspond to a range determined according to the phase information, calculating gradient values of a region corresponding to the target pixel values and determining gradient information by applying threshold values, which may be determined according to the target pixel values, to the gradient values, and determining a cost volume by weighted summing the data groups based on the gradient information.

DETAILED DESCRIPTION

Specific structural or functional descriptions disclosed herein are merely illustrative for the purpose of describing embodiments according to the concept of the present disclosure. Embodiments according to the concept of the present disclosure may be implemented in various forms, and should not be construed as being limited to the specific embodiments set forth herein.

Hereinafter, embodiments are described with reference to the accompanying drawings in order for those skilled in the art to be able to implement these embodiments, as well as other embodiments in keeping with the technical spirit of the present disclosure.

Various embodiments are directed to an image processing system and an image processing method for determining a cost volume using pixel values of a single image. The single image may be for a still photograph or for a frame of a video.

Figure 1:
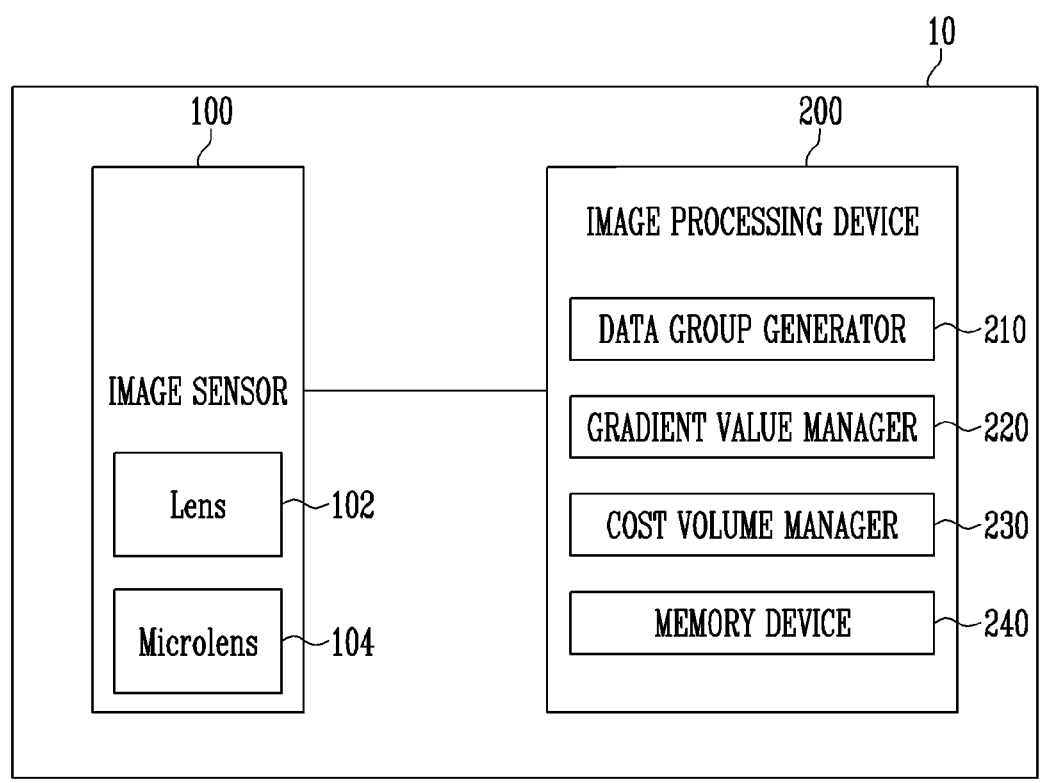
FIG. 1 is a diagram illustrating an example image processing system according to an embodiment.

FIG. 1 is a diagram illustrating an example image processing system 10 according to an embodiment.

Referring to FIG. 1, the image processing system 10 may include an image sensor 100 and an image processing device 200.

The image processing system 10 according to an embodiment may obtain an image via, for example, the image sensor 100. The obtained image may be processed by the image processing device 200, which may produce a processed image as an output image. The output image may be output to an external device (not shown). The external device may store and/or display the output image. The image processing system 10 according to an embodiment may include a memory device 240 for storage (including images) and/or a display (not shown) on which the image may be displayed. The memory device 240 may use any one or more of volatile and/or non-volatile memory devices as determined according to design and/or implementation specifications. The image processing system 10 according to an embodiment may output the output image to, for example, a host (not shown) in response to a request from the host.

The image sensor 100 may generate image data for an object (not shown) whose image is captured using a lens 102. The lens 102 may include at least one lens that forms an optical system. For example, the lens 102 may include microlenses 104.

The image sensor 100 may include a plurality of pixels that receive light. The term "pixel" may be used to refer to a hardware device that detects (or receives) light. The hardware pixel may then output pixel values for the detected light. Accordingly, the plurality of pixels in the image sensor 100 may generate a plurality of pixel values that correspond to a frame of a photographed image or a frame of video. The term "pixel" may also be used to refer to a particular position of the frame. Therefore, a pixel at a particular position in a frame may be associated with pixel values provided by the corresponding hardware pixel of the image sensor 100. According to an embodiment, all of the plurality of pixel values generated by the image sensor 100 may be processed to obtain phase information and brightness (intensity) information of the image.

The plurality of pixel values generated by the image sensor 100 may be transmitted to the image processing device 200, The image processing device 200 may then obtain the phase information and the brightness information of the image by processing the plurality of pixel values.

The image processing device 200 may include a data group generator 210, a gradient value manager 220, a cost volume manager 230, and the memory device 240. The image processing device 200 may receive the plurality of pixel values from the image sensor 100. At least some of the plurality of pixel values received from the image sensor 100 may include the phase information and/or the brightness information. Accordingly, in an embodiment, all of the plurality of pixel values received from the image sensor 100 may include the phase information and the brightness information.

The data group generator 210 may determine data groups that indicate disparity of the mage based on target pixel values corresponding to a range determined according to the phase information of the plurality of pixel values. A "target pixel" may be a particular pixel of a frame at issue. The "target pixel value" may be a pixel value associated with that target pixel. In an embodiment, the disparity of the image may be binocular disparity of an observer. The term "determine" may indicate using, for example, a look-up table, executing software instructions, using hardware circuitry, or performing other functions to get the desired output.

The disparity of the image may refer to a distance between the image sensor 100 and an object. For example, the disparity of the image may increase when the distance between the image sensor 100 and the object decreases.

Accordingly, the disparity of the image may be inversely proportional to a depth of the image. For example, a depth of a part of the image may decrease when the disparity of the part of the image increases.

The data group generator 210 may determine a first data group that indicates disparity with respect to a horizontal direction of the image based on the target pixel values. The data group generator 210 may also determine a second data group that indicates disparity with respect to a vertical direction of the image. According to an embodiment, the number of data groups may vary according to the disparity of the image.

The data group generator 210 may determine averages of the target pixel values in the horizontal direction and averages of the target pixel values in the vertical direction. The data group generator 210 may determine the first data group based on the averages in the horizontal direction. The data group generator 210 may determine the second data group based on the averages in the vertical direction.

The data group generator 210 may select a first reference value from among the averages in the horizontal direction. The data group generator 210 may determine the first data group by comparing the first reference value with the averages in the horizontal direction in a predetermined range.

According to an embodiment, the first data group may indicate a difference between the first reference value and remaining averages in the horizontal direction, that is, the averages in the horizontal direction except for the first reference value. Therefore, it may also be said that the first data group may indicate similarity among the pixel values in the horizontal direction.

The data group generator 210 may select a second reference value from among the averages in the vertical direction. The data group generator 210 may determine the second data group by comparing the second reference value with the averages in the vertical direction in a predetermined range. The data group generator 210 is described in more detail with respect to FIG. 6.

The gradient value manager 220 may determine gradient values of a region corresponding to the target pixel values. The gradient value manager 220 may determine gradient information by applying threshold values determined according to the target pixel values to the gradient values. The gradient value manager 220 is discussed in more detail with respect to FIGS. 7 and 8.

The gradient value manager 220 may, for example, determine a reference value that is a product of an average of the gradient values and the threshold values determined according to the target pixel values. According to an embodiment, the gradient value manager 220 may detect a boundary of a region corresponding to the target pixel values based on gradient values of the region. The gradient value manager 220 is discussed in more detail with respect to FIGS. 7 and 8.

The gradient value manager 220 may determine a gradient value of a region corresponding to the target pixel values as 0 when the product of the average of the gradient values and the threshold values is less than or equal to the gradient value of the region. Similarly, the gradient value manager 220 may maintain the gradient value of a region corresponding to the target pixel values when the product of the average of the gradient values and the threshold values is greater than the gradient value of the region.

According to an embodiment, the gradient value manager 220 may detect the region as a boundary of the image when the gradient value of the region exceeds the threshold value. The gradient value manager 220 may apply a threshold value to a gradient value, where the threshold value varies according to the pixel values.

Humans may sense the same differences in pixel value differently depending on the environment surrounding the pixel value. For example, although differences in pixel values may be the same, humans may "see" greater differences in pixel values in a dark region than in a bright region. Therefore, an embodiment may apply the above-described human visual perception to the threshold value. Accordingly, a larger threshold value may be applied to a gradient value in a first region where a level of a pixel value is larger than in a second region where a level of a pixel value is smaller.

The gradient value manager 220 may determine gradient values in the horizontal direction and gradient values in the vertical direction of a region. Accordingly, the gradient value manager 220 may determine first gradient information by applying threshold values to the gradient values in the horizontal direction and second gradient information by applying threshold values to the gradient values in the vertical direction.

The cost volume manager 230 may determine a cost volume by weighted summing data groups based on gradient information. The cost volume manager 230 may determine the cost volume using an average of a first data group that is weighted based on the first gradient information and a second data group that is weighted based on the second gradient information. The cost volume manager 230 may then determine depth information based on the cost volume. The cost volume manager 230 is described in more detail with respect to FIG. 8.

Figure 2:
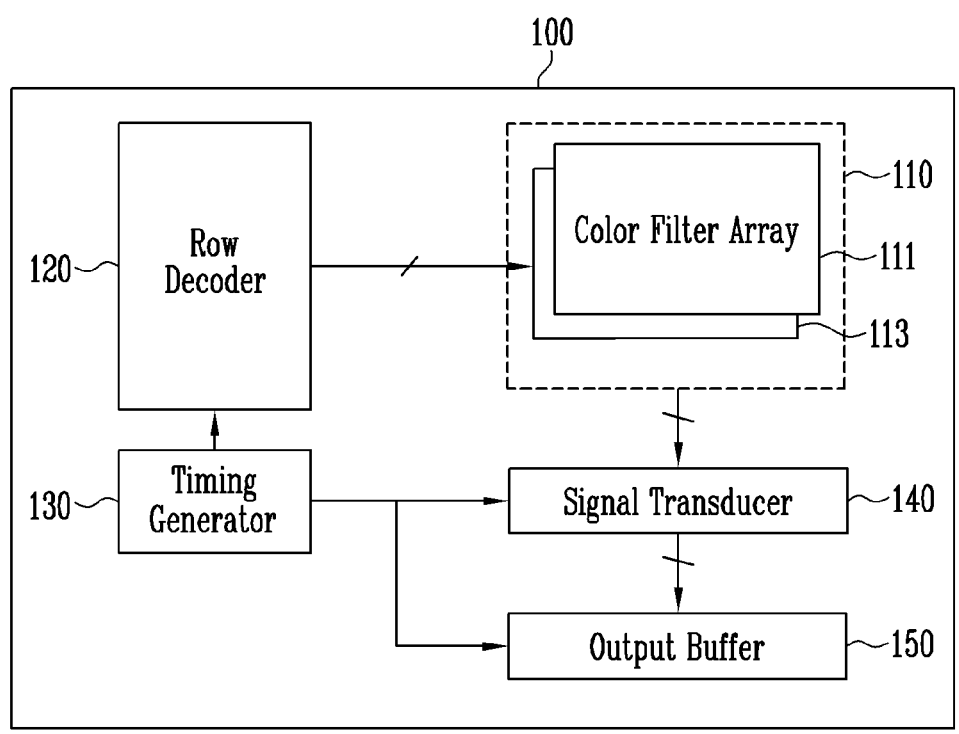
FIG. 2 is a diagram illustrating an example image sensor of FIG. 1 according to an embodiment.

FIG. 2 is a diagram illustrating an example image sensor of FIG. 1 according to an embodiment.

Referring to FIG. 2, the example image sensor may be, for example, the image sensor 100 that may include a pixel array 110, a row decoder 120, a timing generator 130, and a signal transducer 140.

According to an embodiment, the pixel array 110 may include a color filter array 111 and a photoelectric conversion layer 113 formed under the color filter array 111. The photoelectric conversion layer 113 may include a plurality of photoelectric conversion elements. A photoelectric conversion element and a corresponding portion of the color filter array 111 may be referred to as a pixel of the pixel array 110. Accordingly, the pixel array 110 may include a plurality of pixels that may be configured to output a pixel signal corresponding to the incident light that passes through the color filter array 111.

The color filter array 111 may include color filters each of which allows only a particular wavelength (color of light such as red, blue, green, etc.) of light that arrives at each pixel to pass. In the present disclosure, the color filter may be expressed as a color channel. Due to the color filter array 111, the pixel signal from each pixel may include a value corresponding to intensity of light of a particular wavelength.

More specifically, each pixel may accumulate photo-charges generated by incident light and may generate pixel signals corresponding to the accumulated photo-charges. Each pixel may include a photoelectric conversion element that converts the accumulated photo-charges into an electrical signal and at least one transistor for processing the electrical signal to a pixel signal. The photoelectric conversion element may be, for example, a photodiode, a phototransistor, a photogate, or a pinned photodiode.

The pixel array 110 may include the plurality of pixels arranged in a row direction and a column direction. The pixel array 110 may generate a plurality of pixel signals (VPXs) per row. Each of the plurality of pixel signals (VPXs) may be an analog-type pixel signal (VPXs).

According to an embodiment, the microlenses 104 may be disposed over the pixel array 110. Although FIG. 1 shows the microlenses 104 as being separate from the lens 102, various embodiments may have the microlenses 104 as part of the lens 102 or separate from the lens 102 depending on design and/or implementation decisions. Each microlens 104 may correspond to an array of n×n pixels, where n is an integer of two or more. The n×n pixel array may be described as "n square pixels." Each of the microlenses 104 may be physically located over the plurality of pixels. Although a microlens 104 may correspond to n square pixels, various embodiments need not be so limited. For example, another embodiment may associate a microlens 104 with rectangular array of m×n pixels where m and n are each an integer greater than one, or with an array of pixels of another geometric shape. Furthermore, an embodiment may include a first microlens of a first geometric shape and a second microlens of a second geometric shape. Accordingly, in an embodiment there may be one or more geometric shapes used for microlenses 104.

The row decoder 120 may select one of a plurality of rows of pixels in the pixel array 110 in response to an address and control signals output by the timing generator 130.

The signal transducer 140 may convert the analog pixel signals (VPXs) into digital pixel values (DPXs). The digital pixel values (DPXs) may be output in various patterns. The signal transducer 140 may perform correlated double sampling (CDS) on the analog pixel signals output from the pixel array 110 in response to control signals from the timing generator 130, convert the analog pixel signals to digital pixel values, and output the digital pixel values. The digital pixel values may correspond to intensity of wavelengths of incident light that passes through the corresponding color filter array 111.

The signal transducer 140 may include a CDS block and an analog-to-digital converter (ADC) block. The CDS block may sequentially sample and hold sets of a reference signal and an image signal, which are respectively provided to a plurality of column lines included in the pixel array 110. The ADC block may output pixel data obtained by converting a correlated double sampling signal for each column that is output from the CDS block into a digital signal. For conversion and output, the ADC block may include a comparator and a counter corresponding to each column.

In addition, the image sensor 100 according to an embodiment may further include an output buffer 150. The output buffer 150 may include a plurality of buffers for storing digital signals output from the signal transducer 140. More specifically, the output buffer 150 may latch and output pixel data in unit of column that is provided from the signal transducer 140. The output buffer 150 may temporarily store the pixel data output from the signal transducer 140 and sequentially output the pixel data according to control of the timing generator 130. According to an embodiment, the output buffer 150 may be omitted.

Figure 3:
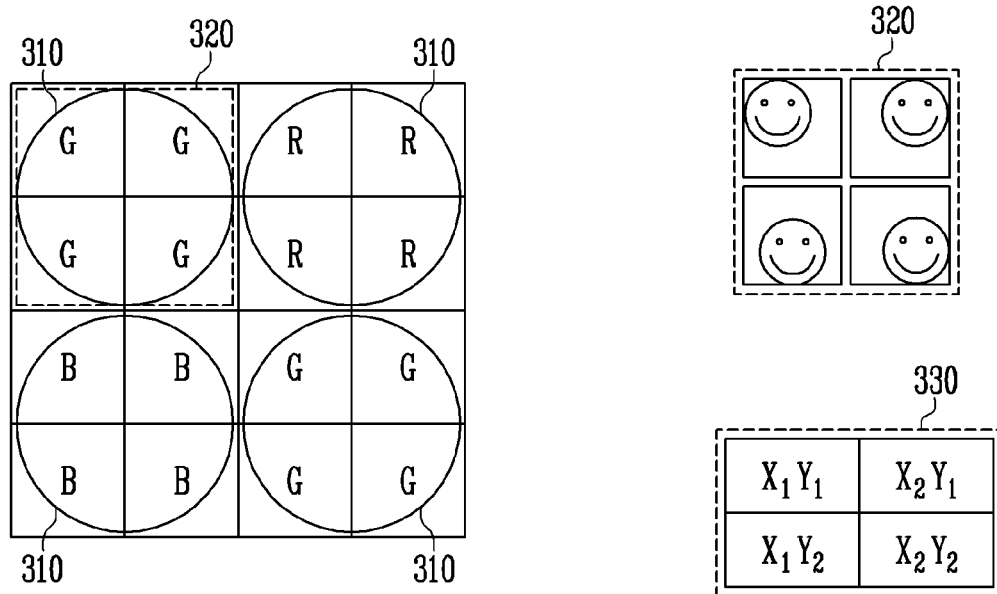
FIG. 3 is a diagram illustrating an example pixel array in which four pixel values correspond to a single microlens according to an embodiment.

FIG. 3 is a diagram illustrating an example pixel array in which four pixel values correspond to a single microlens according to an embodiment.

Referring to FIG. 3, a plurality of microlenses 320 that transfer light received from outside the image sensor 100 to pixels 310 in the image sensor 100 are illustrated. Each microlens 320 may be located over an array of pixels 310. FIG. 3 illustrates an example where four pixels 310 correspond to a single microlens 320. According to an embodiment illustrated in FIG. 3, four green color pixels 310 adjacent to each other may correspond to a single microlens 320. Further, four red color pixels 310 may correspond to another single microlens 320 and four blue color pixels 310 may correspond to another single microlens 320, FIG. 3 illustrates sixteen pixels that correspond to four microlenses. A plurality of pixels 310 that correspond to the same microlens 320 may receive the same color light. For example, green color pixels 310 may correspond to a single microlens 320. Pixel values of the green color pixels 310 may include phase information of light. The phase may be affected, for example, by the location of a pixel 310 as well as its offset in location with respect to the other pixels 310 in the microlens 320. This can be seen in the microlens 320 in FIG. 3 where each of the four pixels 310 differs in position with respect to the other pixels 310.

Four blue color pixels 310 or four red color pixels 310 may correspond to another single microlens 320. Similarly, pixel values of the four blue color pixels 310 or the four red color pixels 310 may also include phase information.

However, embodiments of the present disclosure are not limited to the embodiment in which four pixels correspond to a single microlens. Accordingly, the number of pixels that correspond to a single microlens may vary for different embodiments. However, although the number of pixels that correspond to a single microlens may vary, colors of the pixels that correspond to the single microlens may be the same.

According to an embodiment, an image sensor may generate pixel values including information on a phase in every pixel. According to the embodiment illustrated in FIG. 3, phase information included in pixel values may be different for each pixel according to differences in position of the four pixels 320 corresponding to the same microlens. This may be, for example, because the four pixels 320 corresponding to the same microlens may indicate different phase information according to differences in position. According to an embodiment, depth information of an image may be obtained based on differences in phase information included in four pixel values 330 for a microcell.

A boundary of an object included in the image may be defined based on the four pixel values 330 that may include the phase information and the differences in position of the four pixels 320. According to an embodiment, the boundary of the object may be detected by determining a gradient value, FIG. 4 is a diagram illustrating an example pixel array in which nine pixel values correspond to a single microlens according to an embodiment.

Figure 4:
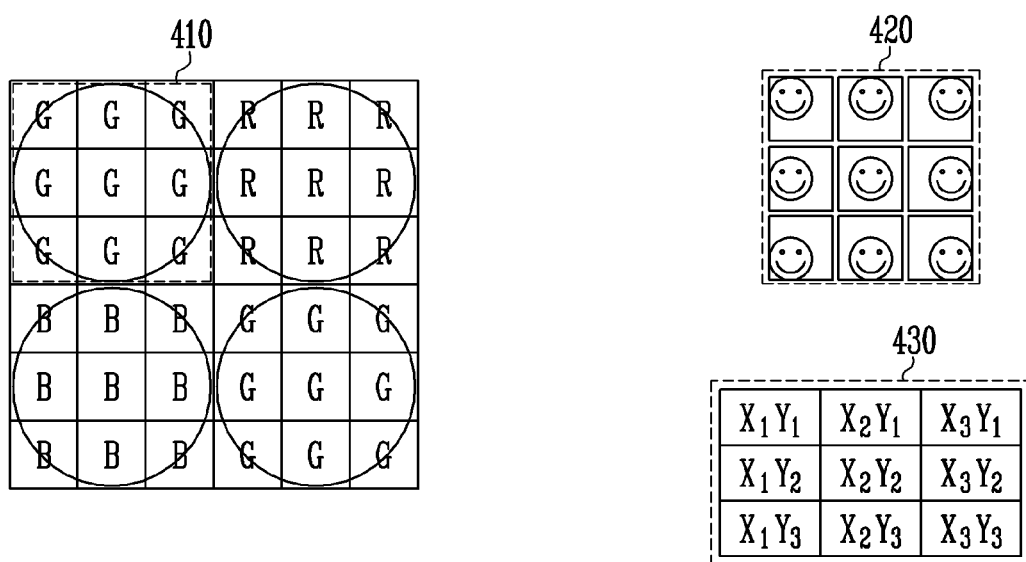
FIG. 4 is a diagram illustrating an example pixel array in which nine pixel values correspond to a single microlens according to an embodiment.

Referring to FIG. 4, nine pixels may correspond to a single microlens. According to an embodiment illustrated in FIG. 4, nine green color pixels 410 adjacent to each other may correspond to a single microlens. Further, nine red color pixels may correspond to another single microlens and nine blue color pixels may correspond to another single microlens.

FIG. 4 illustrates that thirty six pixels correspond to four microlenses. A plurality of pixels that correspond to the same microlens may receive the same color light. For example, red color pixels may correspond to a single microlens. Pixel values of the red color pixels may include phase information of light received from the microlens arrives at the red color pixels. The phase information may be affected by the location of the pixel as well as its offset in location with respect to the other pixels in the microlens. This can be seen in microlens 420 in FIG. 4 where each of the nine pixels differs in position with respect to the other pixels.

Nine blue color pixels or nine green color pixels may correspond to another single microlens. Similarly, pixel values of the nine blue color pixels or the nine green color pixels may also include phase information.

According to an embodiment, an image sensor may generate pixel values including information on a phase in every pixel. According to the embodiment illustrated in FIG. 4, phase information included in pixel values may be different for each pixel according to differences in position of the nine pixels 420 corresponding to the same microlens. This may be, for example, because the nine pixels 420 corresponding to the same microlens may indicate different phase information according to differences in position. According to an embodiment, depth information of an image may be obtained based on differences in phase information included in nine pixel values 430.

A boundary of an object included in the image may be defined based on the nine pixel values 430 that may include the phase information and the differences in position of the nine pixels 420. According to an embodiment, the boundary of the object may be detected by determining a gradient value.

Accordingly, an image sensor with a pixel array in which nine pixels correspond to a single microlens may be used in an embodiment. Clarity of an image may increase as the number of pixels corresponding to a single microlens increases, FIG. 5 is a diagram illustrating an example pixel array in which sixteen pixel values correspond to a single microlens according to an embodiment.

Figure 5:
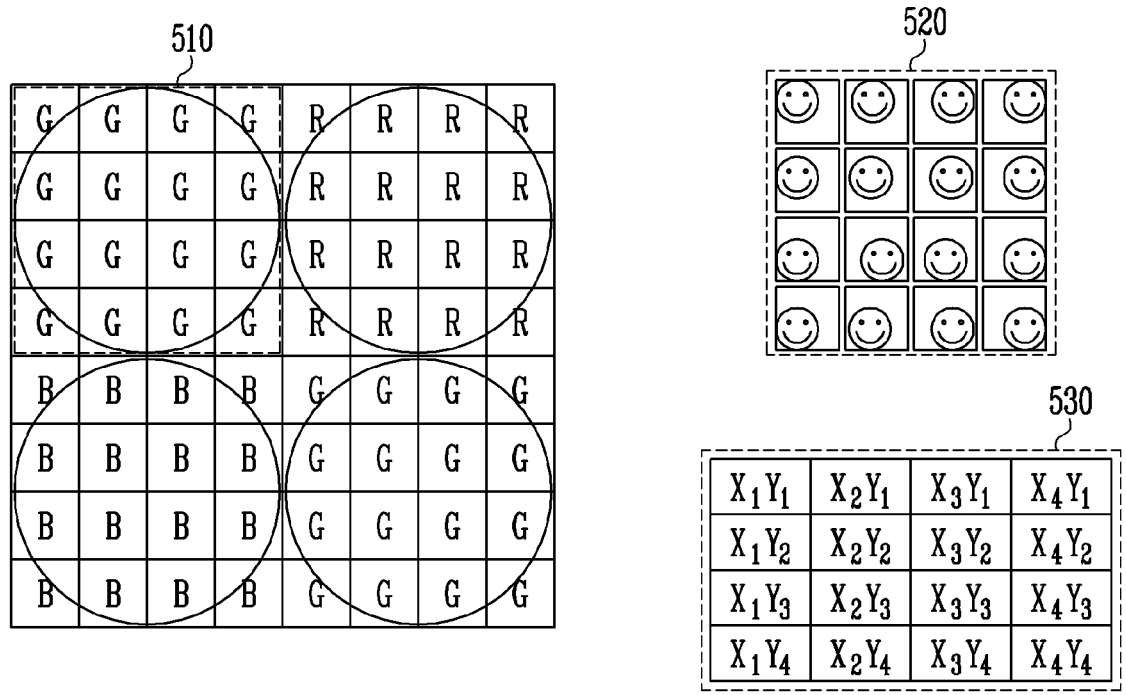
FIG. 5 is a diagram illustrating an example pixel array in which sixteen pixel values correspond to a single microlens according to an embodiment.

Referring to FIG. 5, sixteen pixels may correspond to a single microlens. According to an embodiment illustrated in FIG. 5, sixteen green color pixels 510 adjacent to each other may correspond to a single microlens. Further, sixteen red color pixels may correspond to another single microlens and sixteen blue color pixels may correspond to another single microlens.

FIG. 5 illustrates that sixty four pixels correspond to four microlenses. Colors of pixels that correspond to the same microlens may be the same. For example, red color pixels may correspond to a single microlens. Pixel values of the red color pixels may include phase information of light received from the microlens arrives at the red color pixels. The phase information may be affected by the location of the pixel as well as its offset in location with respect to the other pixels in the microlens. This can be seen in microlens 520 in FIG. 5 where each of the sixteen pixels differs in position with respect to the other pixels.

Sixteen blue color pixels or sixteen green color pixels may correspond to another single microlens. Similarly, pixel values of the sixteen blue color pixels or the sixteen green color pixels may also include phase information.

According to an embodiment, an image sensor may generate pixel values including information on a phase in every pixel. According to an embodiment illustrated in FIG. 5, phase information included in pixel values may be different from each other according to differences in position of the sixteen pixels 520 corresponding to the same microlens. Objects included in the sixteen pixels 520 corresponding to the same microlens may indicate different phase information according to differences in position. According to an embodiment, depth information of an image may be obtained based on differences in phase information included in sixteen pixel values 530.

Boundaries of the objects included in the image may be defined based on the sixteen pixel values 530 including the phase information and the differences in position of the sixteen pixels 520. According to an embodiment, the boundaries of the objects may be detected by determining a gradient value.

The embodiment illustrated in each of FIGS. 3, 4, and 5 is merely provided as an example. The number of pixels that correspond to a single microlens is not limited to the embodiments illustrated in FIGS. 3, 4, and 5.

Figure 6:
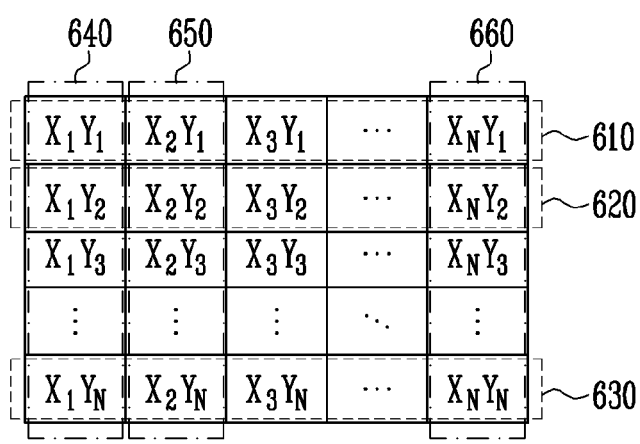
FIG. 6 is a diagram illustrating an example method of determining a data group according to an embodiment.

FIG. 6 is a diagram illustrating an example method of determining a data group according to an embodiment.

FIG. 6 illustrates pixel values that correspond to a single microlens as an example. For example, n square pixels may correspond to a microlens included in an image sensor, where n is an integer of two or more. According to an embodiment illustrated in FIG. 6, pixel values may be determined in the horizontal direction and the vertical direction.

A data group generator such as, for example, the data group generator 210, may determine a data group in the horizontal direction that indicates disparity of an image. According to an embodiment, the number of pieces of data included in the data group in the horizontal direction nay vary according to the disparity of the image.

The data group generator may determine an average (Row1) of pixel values of a first row 610. The average (Row1) of the pixel values of the first row 610 may be expressed by Equation 1 below.

$$Row1 = AVG(X_1Y_1, X_2Y_1, \ldots, X_NY_1)$$ Equation 1

The data group generator may determine an average (Row2) of pixel values of a second row 620. The average (Row2) of the pixel values of the second row 620 may be expressed by Equation 2 below.

$$Row2 = AVG(X_1Y_2, X_2Y_2, \ldots, X_NY_2)$$ Equation 2

Similarly, the data group generator may determine an average (RowN) of pixel values of an Nth row 630. The average (RowN) of the pixel values of the Nth row 630 may be expressed by Equation 3 below.

$$RowN = AVG(X_1Y_N, X_2Y_N, \ldots, X_NY_N)$$ Equation 3

The data group generator may select a first reference value among averages in the horizontal direction (Row1, Row2, RowN). The data group generator may generate the data group in the horizontal direction that includes data determined by moving and comparing the averages in the horizontal direction (Row1, Row2, RowN) with the first reference value in a predetermined range.

For example, the data group generator may select the average (Row1) of the pixel values of the first row 610 as the first reference value from among the averages in the horizontal direction (Row1, Row2, RowN). The data group generator may determine data (DataRow1) by moving and comparing the average (Row2) of the pixel values of the second row 620 with the first reference value. Alternatively, the data group generator may select the average (Row2) of the pixel values of the second row 620 as the first reference value and determine data (DataRow2) by moving and comparing the average (Row3) of the pixel values of the third row with the first reference value. Similarly, the data group generator may select the average (RowN−1) of the pixel values of the (N−1)th row as the first reference value and determine data (DataRowN−1) by moving and comparing the average (RowN) of the pixel values of the Nth row 630 with the first reference value. The data group generator may determine a first data group including pieces of data (DataRow1, DataRow2, . . . , DataRowN−1) determined by comparing the averages of the pixel values with the first reference value.

The data group generator may determine an average (Col1) of pixel values of a first column 640. The average (Col1) of the pixel values of the first column 640 may be expressed by Equation 4 below.

$$Col1 = AVG(X_1Y_1, X_1Y_2, \ldots, X_1Y_N)$$ Equation 4

The data group generator may determine an average (Col2) of pixel values of a second column 650. The average (Col2) of the pixel values of the second column 650 may be expressed by Equation 5 below.

$$Col2 = AVG(X_2Y_1, X_2Y_2, \ldots, X_2Y_N)$$ Equation 5

Similarly, the data group generator may determine an average (COlN) of pixel values of an Nth column 660. The average (ColN) of the pixel values of the Nth column 660 may be expressed by Equation 6 below.

$$COlN = AVG(X_NY_1, X_NY_2, \ldots, X_NY_N)$$ Equation 6

The data group generator may select a second reference value from among averages in the vertical direction (Col1, Col2, ColN). The data group generator may determine the data group in the vertical direction that includes data generated by moving and comparing the averages in the vertical direction (Col1, Col2, COlN) with the second reference value in a predetermined range For example, the data group generator may select the average (Col1) of the pixel values of the first column 640 as the second reference value from among the averages in the vertical direction (Col1, Col2, ColN). The data group generator may determine data (DataCol1) by moving and comparing the average (Col2) of the pixel values of the second column 650 with the second reference value. The data group generator may select the average (Col2) of the pixel values of the second column 650 as the second reference value and determine data (DataCol2) by moving and comparing the average (Col3) of the pixel values of the third column with the second reference value. Similarly, the data group generator may select the average (COlN−1) of the pixel values of the (N−1)th column as the second reference value and determine data (DataColN−1) by moving and comparing the average (COlN) of the pixel values of the Nth column 660 with the second reference value. The data group generator may determine a second data group including pieces of the data (DataCol1, DataCol2, DataColN−1) determined by comparing the averages of the pixel values with the second reference value.

Figure 7:
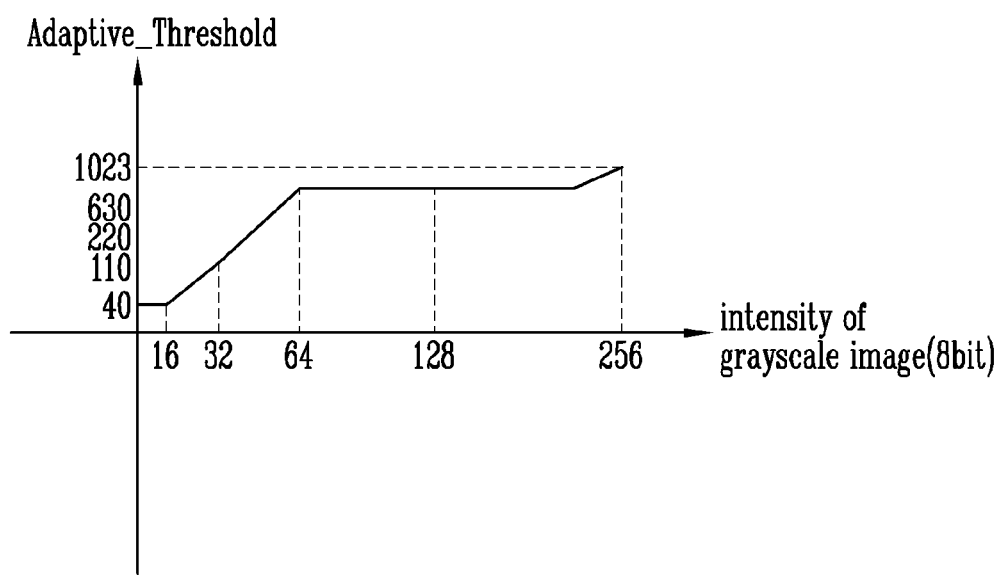
FIG. 7 is a diagram illustrating an example threshold value determined according to pixel values according to an embodiment.

FIG. 7 is a diagram illustrating an example threshold value determined according to pixel values according to an embodiment.

Referring to FIG. 7, a threshold value that is applied to gradient values may vary according to pixel values. As described previously, humans sense the same difference in pixel value as if the differences were not the same depending on levels of the pixel values. According to an embodiment, the above-described human visual features may be applied to the threshold value. FIG. 7 illustrates pixel values and threshold values according to an embodiment. However, embodiments of the present disclosure are not limited to just the embodiment shown in FIG. 7.

In FIG. 7, the x axis may be intensity of a grayscale image. According to an embodiment, the intensity of the image may refer to a level of a pixel value. In FIG. 7, the y axis may be a threshold value that varies. The threshold value may vary for example, according to the level of the pixel value. Thus, FIG. 7 may show a threshold value that is different depending on the pixel value.

For the same difference in pixel value, humans may perceive the difference in pixel value in a dark region as greater than the same difference in pixel value in a bright region. Accordingly, the threshold value applied to a gradient value in a region where the pixel values are larger may be greater than the threshold value applied to a gradient value in a region where the pixel values are smaller.

In FIG. 7, in a section where the pixel value is less than 16, the threshold value may be 40. In a section where the pixel value is greater than or equal to 16 and less than 32, the threshold value may increase in proportion to the pixel value. For the threshold value corresponding to a dark region where the pixel value is less than or equal to 16 may be smaller than the threshold value corresponding to a bright region where the pixel value is greater than or equal to 64. In the dark region, even when a difference in pixel value is small, one pixel may be distinguishable from another pixel.

According to an embodiment, a gradient value manager, such as, for example, the gradient value manager 220, may determine threshold values to be applied to gradient values. Accordingly, the threshold values may be different for the same difference in pixel values for different regions. The gradient value manager may determine a threshold value applied to gradient values in the dark region to be smaller than a threshold value applied to gradient values in the bright region. The gradient value manager may determine a threshold value by, for example, using a look-up table, executing software and/or hardware instructions to calculate the threshold value, or perform other functions to determine the threshold values.

Figure 8:
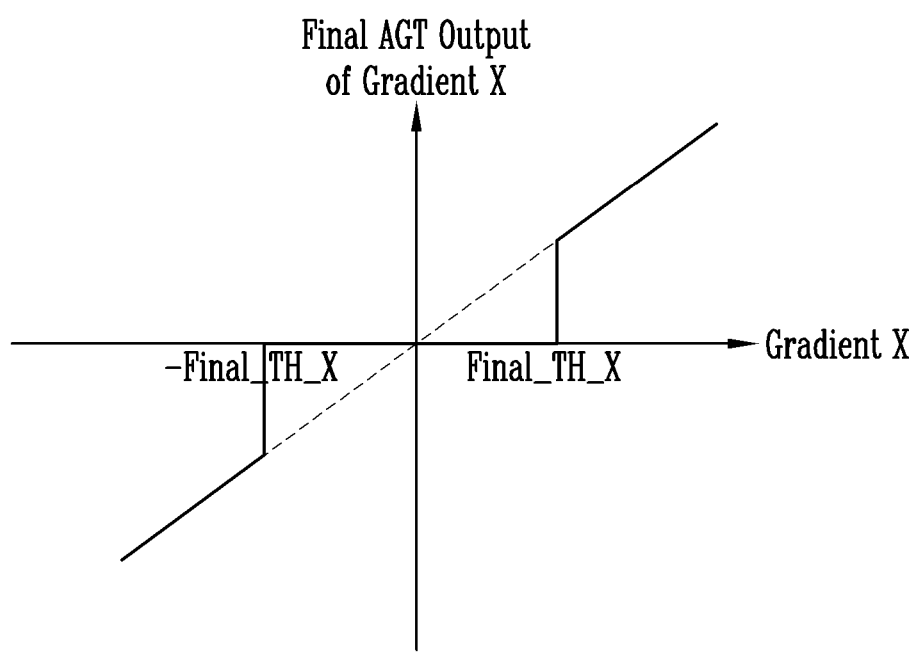
FIG. 8 is a diagram illustrating an example method of applying a threshold value to gradient values according to an embodiment.

FIG. 8 is a diagram illustrating an example method of applying a threshold value to gradient values according to an embodiment.

Referring to FIG. 8, a gradient value of a region corresponding to target pixels may be determined to be 0 in a predetermined range. A region that has a gradient value of 0 might not be detected as a boundary. In FIG. 8, a range where a gradient value is determined to be 0 may vary according to pixel values.

In FIG. 8, the x axis may represent a gradient value and the y axis may represent an output gradient value. The range where gradient values are output as 0 may vary according to pixel values.

The gradient value manager, which may be similar to the gradient value manager 220, may determine a reference value that is a product of an average of the gradient values and threshold values determined according to target pixel values. According to an embodiment, the reference value may vary according to the target pixel values.

The gradient value manager may compare a gradient value of a corresponding region with the reference value. The gradient value manager may output unchanged the gradient value of the corresponding region when the gradient value of the corresponding region is greater than the reference value. The gradient value manager may output zero as the gradient value of the corresponding region when the gradient value of the corresponding region is less than or equal to the reference value.

According to an embodiment, the gradient value manager may determine gradient values in the horizontal direction and gradient values in the vertical direction of the region corresponding to the target pixels. The gradient value manager may determine first gradient information by applying threshold values to the gradient values in the horizontal direction and second gradient information by applying the threshold values to the gradient values in the vertical direction.

Referring back to FIG. 6, FIG. 6 illustrates a method where the gradient value manager determines the first gradient information and the second gradient information. The gradient value manager may determine a gradient value of the first row (GradientRow1) based on the pixel values of the first row 610. The gradient value manager may determine an adaptive gradient value of the first row (AGTRow1) by applying the gradient value of the first row (GradientRow1) to a threshold value determined according to the pixel values of the first row 610.

The gradient value manager may determine a gradient value of the second row (GradientRow2) based on the pixel values of the second row 620. The gradient value manager may determine an adaptive gradient value of the second row (AGTRow2) by applying the gradient value of the second row (GradientRow2) to a threshold value determined according to the pixel values of the second row 620.

Similarly, the gradient value manager may determine an adaptive gradient value of the (N−1)th row (AGTRowN−1) based on the pixel values of the (N−1)th row. The gradient value manager may determine the first gradient information including the adaptive gradient values (AGTRow1, AGTRow2, . . . , AGTRowN−1).

The gradient value manager may determine a gradient value of the first column (GradientCol1) based on the pixel values of the first column 640. The gradient value manager may determine an adaptive gradient value of the first column (AGTCol1) by applying the gradient value of the first column (GradientCol1) to a threshold value determined according to the pixel values of the first column 640.

The gradient value manager may determine a gradient value of the second column (GradientCol2) based on the pixel values of the second column 650. The gradient value manager may determine an adaptive gradient value of the second column (AGTCol2) by applying the gradient value of the second column (GradientCol2) to a threshold value determined according to the pixel values of the second column 650.

Similarly, the gradient value manager may determine an adaptive gradient value of the (N−1)th column (AGTColN−1) based on the pixel values of the (N−1)th column. The gradient value manager may determine the second gradient information including the adaptive gradient values (AGTCol1, AGTCol2, AGTColN−1).

According to an embodiment, the cost volume manager, such as, for example, the cost volume manager 230, may determine a cost volume of an image using an average of a first data group that is weighted based on the first gradient information and a second data group that is weighted based on the second gradient information. The cost volume manager may obtain depth information of the image based on the cost volume of the image.

For example, the cost volume manager may determine a cost volume in the horizontal direction (costvolumRow). The cost volume in the horizontal direction (costvolumRow) may be a value obtained by dividing the weighted sum of the adaptive gradient values (AGTRow1, AGTRow2, . . . , AGTRowN−1) included in the first gradient information and the data (DataRow1, DataRow2, . . . , DataRowN−1) included in the first data group by the sum of the adaptive gradient values (AGTRow1, AGTRow2, . . . , AGTRowN−1) included in the first gradient information. The cost volume in the horizontal direction (costvolumRow) may be expressed by Equation 7 below.

$$\text{costvolumRow}(\text{abs}(AGTRow1)*DataRow1+\text{abs}(AGTRow2)*DataRow2+ \ldots +\text{abs}(AGTRowN-1)*DataRowN-1))(\text{abs}(AGTRow1)+\text{abs}(AGTRow2)+ \ldots +\text{abs}(AGTRowN-1))) \quad \text{Equation 7}$$

The cost volume manager may determine a cost volume in the vertical direction (costvolumCol). The cost volume in the vertical direction (costvolumCol) may be a value obtained by dividing the weighted sum of the adaptive gradient values (AGTCol1, AGTCol2, . . . , AGTColN−1) included in the second gradient information and the data (DataCol1, DataCol2, . . . , DataColN−1) included in the second data group by the sum of the adaptive gradient values (AGTCol1, AGTCol2, . . . , AGTColN−1) included in the second gradient information. The cost volume in the vertical direction (costvolumCol) may be expressed by Equation 8 below.

$$\text{costvolumCol}=(\text{abs}(AGTCol1)*DataCol1+\text{abs}(AGTCol2)*DataCol2+ \ldots +\text{abs}(AGTColN-1)*DataColN-1))/(\text{abs}(AGTCol1)+\text{abs}(AGTCol2)+ \ldots +\text{abs}(AGTColN-1)) \quad \text{Equation 8}$$

The cost volume manager may determine a cost volume of the image (costvolum). The cost volume of the image (costvolum) may be an average of the cost volume in the horizontal direction (costvolumRow) and the cost volume in the vertical direction (costvolumCol). The cost volume of the image (costvolum) may be expressed by Equation 9 below.

$$\text{costvolum}=AVG(\text{costvolumRow},\text{costvolumCol}) \quad \text{Equation 9}$$

Figure 9:
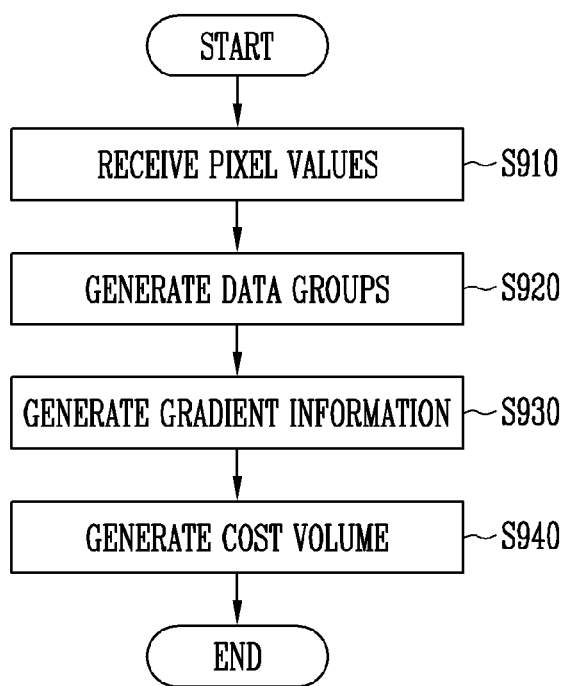
FIG. 9 is a flowchart illustrating an example method of determining a cost volume according to an embodiment.

FIG. 9 is a flowchart illustrating an example method of determining a cost volume according to an embodiment.

Referring to FIG. 9, an image processing device such as, for example, the image processing device 200, may determine a cost volume that may be used to obtain depth information of an image based on pixel values received from, for example, the image sensor 100, or from a device other than the image processing device 200. For example, the pixel values may be received from a device external to the image processing system 10 that is not be shown. The image processing device may determine a data group and gradient information in each of the horizontal direction and the vertical direction, and then determine a cost volume of the image by weighted summing the determined data groups and the determined gradient information.

At step S910, the image processing device may receive pixel values from all pixels included in the image. The pixel values may include one or both of phase information and brightness information. The image processing device may obtain the depth information of the image based on the received pixel values.

At step S920, the data group generator of the image processing device may determine the data groups that indicate disparity of the image. This may be done based on target pixel values corresponding to a range determined according to the phase information among the pixel values.

The data group generator may determine a first data group that indicates disparity with respect to the horizontal direction of the image based on the target pixel values. Further, the data group generator may determine a second data group that indicates disparity with respect to the vertical direction of the image based on the target pixel values.

The data group generator may determine the data group in the horizontal direction and the data group in the vertical direction that indicate disparity of the image. The number of pieces of data included in each of the data groups may vary according to the disparity of the image.

The data group generator may select a first reference value from among the averages in the horizontal direction (Row1, Row2, . . . , RowN). The data group generator may determine the data group in the horizontal direction that includes data obtained by moving and comparing the averages in the horizontal direction (Row1, Row2, . . . , RowN) with the first reference value in a predetermined range.

The data group generator may select a second reference value from among the averages in the vertical direction (Col1, Col2, ColN). The data group generator may determine the data group in the vertical direction that includes data obtained by moving and comparing the averages in the vertical direction (Col1, Col2, . . . , ColN) with the second reference value in a predetermined range.

At step S930, the gradient value manager of the image processing device may determine gradient values and threshold values of a region corresponding to the target pixel values. The gradient value manager may then determine gradient information by applying threshold values to the gradient values.

According to an embodiment, the gradient value manager may determine the threshold values, which are applied to the gradient values, to be different according to pixel values of a corresponding region. For example, the gradient value manager may determine a threshold value applied to gradient values in a dark region to be smaller than a threshold value applied to gradient values in a bright region.

The gradient value manager may determine a reference value that is a product of an average of the gradient values and the threshold values determined according to the target pixel values. According to an embodiment, the reference value may vary according to the target pixel values.

The gradient value manager may compare a gradient value of the corresponding region with the reference value. The gradient value manager may output unchanged the gradient value of the corresponding region when the gradient value of the corresponding region is greater than the reference value. The gradient value manager may determine the gradient value of the corresponding region to be 0 when the gradient value of the corresponding region is less than or equal to the reference value.

According to an embodiment, the gradient value manager may determine the gradient values in the horizontal direction and gradient values in the vertical direction of a region corresponding to the target pixels. The gradient value manager may determine first gradient information by applying the threshold values to the gradient values in the horizontal direction and second gradient information by applying the threshold values to the gradient values in the vertical direction.

At step S940, the cost volume manager of the image processing device may determine the cost volume by weighted summing the data groups based on the gradient information.

According to an embodiment, the cost volume manager may determine the cost volume of the image using an average of the first data group that is weighted based on the first gradient information and the second data group that is weighted based on the second gradient information. The cost volume manager may obtain the depth information of the image based on the cost volume of the image.

Figure 10:
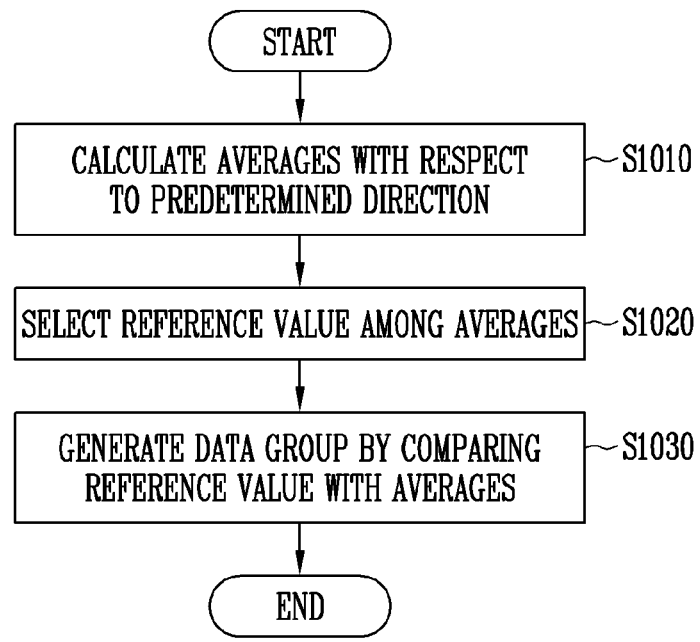
FIG. 10 is a flowchart illustrating an example method of determining data groups according to an embodiment.

FIG. 10 is a flowchart illustrating an example method of determining data groups according to an embodiment.

Referring to FIG. 10, the data group generator of an image processing device such as, for example, the image processing device 200, may determine the data group in the horizontal direction and the data group in the vertical direction that indicate the disparity of the image. The data group generator may determine different data according to the disparity of the image.

At step S1010, the data group generator may determine averages with respect to a predetermined direction based on the pixel values. According to an embodiment, the predetermined direction may be the horizontal direction or the vertical direction.

The data group generator may determine the averages in the horizontal direction (Row1, Row2, . . . , RowN). Further, the data group generator may determine the averages in the vertical direction (Col1, Col2, . . . , ColN).

At step S1020, the data group generator may select the reference value among the determined averages. The data group generator may select the first reference value from among the averages in the horizontal direction (Row1, Row2, . . . , RowN) and the second reference value from among the averages in the vertical direction (Col1, Col2, . . . , ColN).

For example, the data group generator may select the average (Row1) of the pixel values of the first row as the first reference value from among the averages in the horizontal direction (Row1, Row2, . . . , RowN). The data group generator may select the average (Col1) of the pixel values of the first column as the second reference value from among the averages in the vertical direction (Col1, Col2, . . . , ColN).

At step S1030, the data group generator may determine a data group that includes data obtained by comparing the reference value with the averages in a predetermined range. The data group generator may determine the data group in the horizontal direction that includes the data obtained by moving and comparing the averages in the horizontal direction (Row1, Row2, . . . , RowN) with the first reference value in the predetermined range. The data group generator may determine the data group in the vertical direction that includes the data obtained by moving and comparing the averages in the vertical direction (Col1, Col2, . . . , ColN) with the second reference value in the predetermined range.

For example, the data group generator may select the average (Row1) of the pixel values of the first row as the first reference value and determine the data (DataRow1) by moving and comparing the average (Row2) of the pixel values of the second row with the first reference value. Similarly, the data group generator may select the average (RowN−1) of the pixel values of the (N−1)th row as the first reference value and determine the data (DataRowN−1) by moving and comparing the average (RowN) of the pixel values of the Nth row with the first reference value. The data group generator may determine the first data group including the pieces of the data (DataRow1, DataRow2, DataRowN−1) determined by comparing the averages with the first reference value.

According to an embodiment, the data group generator may select the average (Col1) of the pixel values of the first column as the second reference value and determine the data (DataCol1) by moving and comparing the average (Col2) of the pixel values of the second column with the second reference value. Similarly, the data group generator may select the average (ColN−1) of the pixel values of the (N−1)th column as the second reference value and determine the data (DataColN−1) by moving and comparing the average (ColN) of the pixel values of the Nth column 660 with the second reference value. The data group generator may determine the second data group including the pieces of the data (DataCol1, DataCol2, . . . , DataColN−1) determined by comparing the averages with the second reference value.

Figure 11:
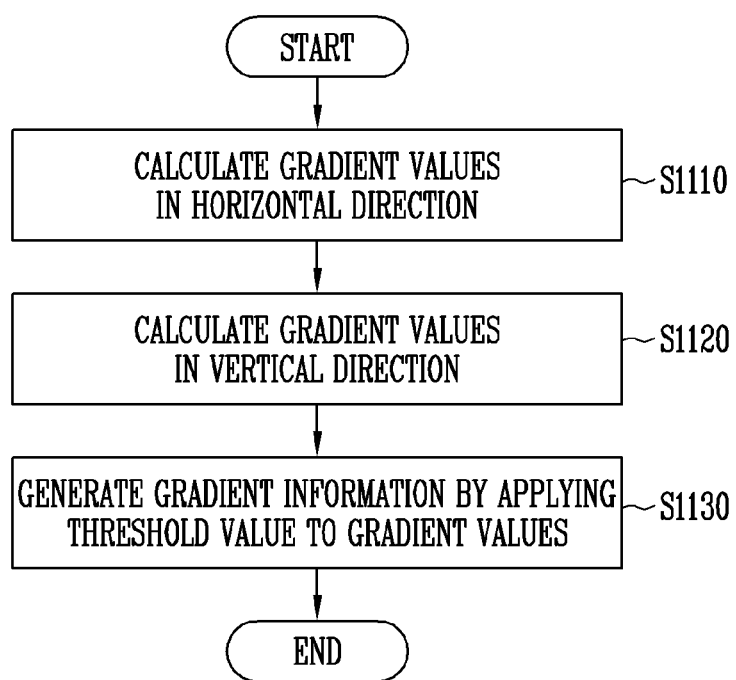
FIG. 11 is a flowchart illustrating an example method of determining gradient information according to an embodiment.

FIG. 11 is a flowchart illustrating an example method of determining gradient information according to an embodiment.

Referring to FIG. 11, the gradient value manager of an image processing device such as, for example, the image processing device 200, may determine the gradient values of the region corresponding to the target pixel values and determine the gradient information by applying the threshold values determined according to the target pixel values to the gradient values. The gradient value manager may determine the first gradient information by applying the threshold values to the gradient values in the horizontal direction and the second gradient information by applying the threshold values to the gradient values in the vertical direction.

At step S1110, the gradient value manager may determine the gradient values in the horizontal direction based on the pixel values. The gradient value manager may determine the gradient value of the first row (GradientRow1) based on the pixel values of the first row. The gradient value manager may determine the gradient value of the (N−1)th row (GradientRowN−1) based on the pixel values of the (N−1)th row.

At step S1120, the gradient value manager may determine the gradient values in the vertical direction based on the pixel values. The gradient value manager may determine the gradient value of the first column (GradientCol1) based on the pixel values of the first column. The gradient value manager may determine the gradient value of the (N−1)th column (GradientColN−1) based on the pixel values of the (N−1)th column.

At step S1130, the gradient value manager may determine the first gradient information by applying the threshold values to the gradient values in the horizontal direction and the second gradient information by applying the threshold values to the gradient values in the vertical direction. According to an embodiment, the gradient value manager may determine the threshold values, which are applied to the gradient values, to be different according to the pixel values of the corresponding region. The gradient value manager may determine a threshold value applied to gradient values in a dark region to be smaller than a threshold value applied to gradient values in a bright region.

The gradient value manager may determine the reference value that is the product of the average of the gradient values and the threshold values determined according to the target pixel values. According to an embodiment, the reference value may vary according to the target pixel values.

The gradient value manager may compare the gradient value of the corresponding region with the reference value. The gradient value manager may output unchanged the gradient value of the corresponding region when the gradient value of the corresponding region is greater than the reference value. The gradient value manager may determine the gradient value of the corresponding region to be 0 when the gradient value of the corresponding region is less than or equal to the reference value.

According to an embodiment, the gradient value manager may determine the gradient values in the horizontal direction and the gradient values in the vertical direction of the region corresponding to the target pixels. The gradient value manager may determine the first gradient information by applying the threshold values to the gradient values in the horizontal direction and the second gradient information by applying the threshold values to the gradient values in the vertical direction.

The gradient value manager may deter mine the adaptive gradient value of the first row (AGTRow1) by applying the gradient value of the first row (GradientRow1) to the threshold value determined according to the pixel values of the first row. Similarly, the gradient value manager may determine the first gradient information including the adaptive gradient values (AGTRow1, AGTRow2, . . . , AGTRowN−1).

The gradient value manager may determine the adaptive gradient value of the first column (AGTCol1) by applying the gradient value of the first column (GradientCol1) to the threshold value determined according to the pixel values of the first column. Similarly, the gradient value manager may determine the second gradient information including the adaptive gradient values (AGTCol1, AGTCol2, . . . , AGTColN−1).

Figure 12:
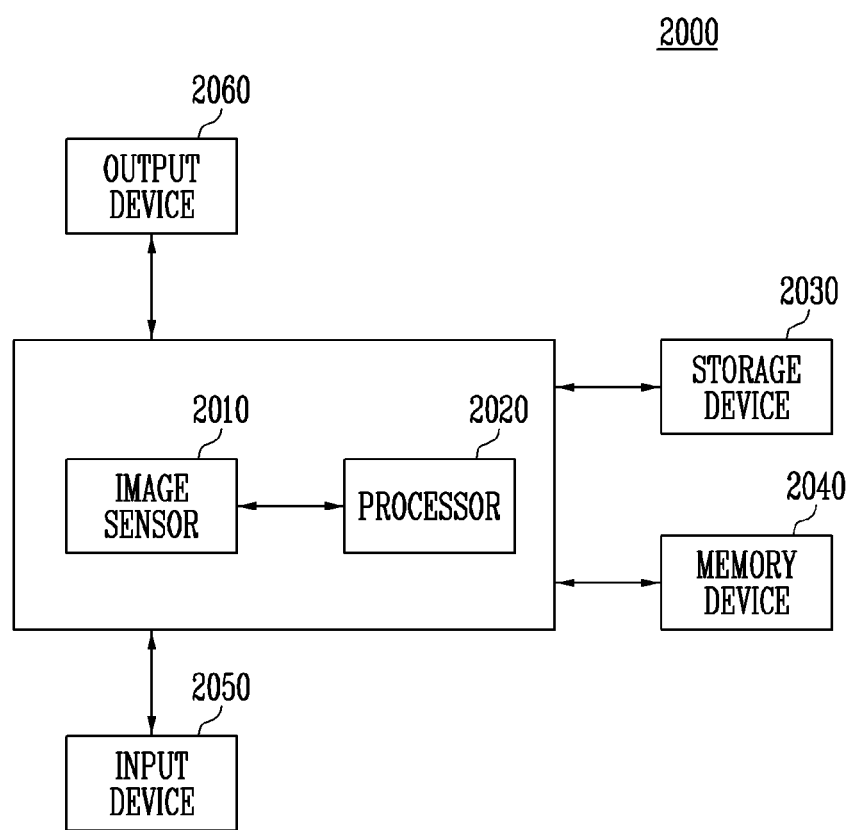
FIG. 12 is a block diagram illustrating an example electronic device including an image sensor according to an embodiment.

FIG. 12 is a block diagram illustrating an example electronic device including an image sensor according to an embodiment.

Referring to FIG. 12, an electronic device 2000 may include an image sensor 2010, a processor 2020, a storage device 2030, a memory device 2040, an input device 2050, and an output device 2060. Although not illustrated in FIG. 12, the electronic device 2000 may further include ports capable of communicating with a video card, a sound card, a memory card, a Universal Serial Bus (USB) device, and/or other electronic devices.

The image sensor 2010 may determine image data corresponding to incident light. The image data may be transferred to and processed by the processor 2020. The output device 2060 may display the image data. The storage device 2030 may store the image data. The processor 2020 may control operations of the image sensor 2010, the output device 2060, and/or the storage device 2030.

The processor 2020 may be an image processing device that performs an operation for processing pixel data received from the image sensor 2010 and outputs the processed image data. The process performed by the processor 2020 may refer to, for example, Electronic Image Stabilization (EIS), interpolation, hue correction, image quality correction, size adjustment, or the like.

The processor 2020 may be provided as a separate chip from the image sensor 2010. For example, the processor 2020 may be formed into a multi-chip package. According to another embodiment, the processor 2020 may be provided as a single chip as a part of the image sensor 2010.

The processor 2020 may perform and control operations of the electronic device 2000. According to an embodiment, the processor 2020 may be a microprocessor, a central processing unit (CPU), an application processor (AP), a microcontroller, or any suitable device that is capable of executing instructions or a command set. The processor 2020 may be coupled to and communicate with the storage device 2030, the memory device 2040, the input device 2050, and the output device 2060 through an address bus, a control bus, and/or a data bus.

According to an embodiment, the processor 2020 may receive pixel values including phase information and brightness information of an image and determine data groups that indicate disparity of the image based on target pixel values corresponding to a range determined according to the phase information. The processor 2020 may determine gradient values of a region corresponding to the target pixel values and determine gradient information by applying threshold values determined according to the target pixel values to the gradient values. The processor 2020 may determine a cost volume by weighted summing the data groups based on the gradient information. Depth information may be determined using the cost volume. Accordingly, the processor 2020 may perform at least some functions of the image processing device 200.

The storage device 2030 may include one or more non-volatile memory devices such as, for example, a flash memory device, a solid-state drive (SSD), a hard disk drive (HDD), compact disc read-only memory (CD-ROM), etc.

The memory device 2040 may store data used to perform operations of the electronic device 2000. For example, the memory device 2040 may include one or more volatile memory devices such as, for example, a Dynamic Random Access Memory (DRAM) device and a Static Random Access Memory (SRAM) device, and one or more non-volatile memory devices such as, for example, an Erasable Programmable Read-Only Memory (EPROM) device, an Electrically Erasable Programmable Read-Only Memory (EEPROM) device, a flash memory device, etc. The processor 2020 may execute a command set stored in the memory device 2040 to control the image sensor 2010 and the output device 2060, as well as other devices as designed or implemented.

The input device 2050 may include an input means such as, for example, a keyboard, a keypad, a mouse, stylus, etc.

The image sensor 2010 may be embodied in packages in various forms. For example, at least some configurations of the image sensor 2010 may use packages such as, for example, a Package on Package (PoP), Ball grid arrays (BGAs), Chip scale packages (CSPs), a Plastic Leaded Chip Carrier (PLCC), a Plastic Dual In-line Package (PDIP), a Die in Waffle Pack, a Die in Wafer Form, a Chip On Board (COB), a Ceramic Dual In-line Package (CERDIP), a Plastic Metric Quad Hat Pack (MQFP), a Thin Quad Flat Pack (TQFP), a Small Outline Integrated Circuit (SOIL), a Shrink Small Outline Package (SSOP), a Thin Small Outline Package (TSOP), a System In Package (SIP), a Multi-Chip Package (MCP), a Wafer-level Fabricated Package (WFP), a Wafer-Level Processed Stack Package (WSP), etc.

The electronic device 2000 may be interpreted as any computing system using the image sensor 2010. The electronic device 2000 may be provided in a form of a packaged module, component, or the like. For example, the electronic device 2000 may be a digital camera, a mobile device, a smartphone, a personal computer (PC), a tablet PC, a laptop, a personal digital assistant (PDA), an enterprise digital assistant (EDA), a portable multimedia player (PMP), a wearable device, a black box, a robot, an autonomous vehicle, or the like.

The scope of the present disclosure is described by claims below rather than the Detailed Description as set forth above. The scope of the present disclosure should be construed as including not only the scope of the claims but also all changes or modifications derived from the meanings, the scope, and equivalents of the claims.

According to various embodiments of the present disclosure, an image processing system capable of obtaining depth information using pixel values of a single image may be provided.

What is claimed is:

1. An image processing device, comprising:
a data group generator configured to:
receive pixel values including phase information and brightness information of an image from a device external to the image processing device; and
determine data groups based on target pixel values, wherein the data groups correspond to a range that is determined according to the phase information;
a gradient value manager configured to:
determine gradient values of a region corresponding to the target pixel values; and
determine gradient information by applying threshold values to the gradient values, wherein the threshold values are determined according to the target pixel values; and
a cost volume manager configured to determine a cost volume by weighted summing the data groups based on the gradient information.

2. The image processing device of claim 1, wherein the data group generator, based on the target pixel values, is configured to:
determine a first data group with respect to a horizontal direction of the image; and
a second data group with respect to a vertical direction of the image.

3. The image processing device of claim 2, wherein the data group generator is configured to:
determine averages of the target pixel values in a horizontal direction and averages of the target pixel values in a vertical direction;
determine the first data group based on the averages of the target pixel values in the horizontal direction; and
determine the second data group based on the averages of the target pixel values in the vertical direction.

4. The image processing device of claim 3, wherein the data group generator is configured to:
select a first reference value from among the averages of the target pixel values in the horizontal direction; and
determine the first data group by comparing the first reference value with the averages of the target pixel values in the horizontal direction in a predetermined range.

5. The Image processing device of claim 3, wherein the data group generator is configured to:
select a second reference value from among the averages of the target pixel values in the vertical direction; and
determine the second data group by comparing the second reference value with the averages of the target pixel values in the vertical direction in a predetermined range.

6. The image processing device of claim 2, wherein the gradient value manager is configured to:
determine gradient values in a horizontal direction and in a vertical direction of the region;
generate first gradient information by applying the threshold values to the gradient values in the horizontal direction; and
determine second gradient information by applying the threshold values to the gradient values in the vertical direction.

7. The image processing device of claim 6, wherein the cost volume manager is configured to determine the cost volume using an average of:
the first data group that is weighted based on the first gradient information, and
the second data group that is weighted based on the second gradient information.

8. The image processing device of claim 1, wherein the gradient value manager is configured to determine a gradient value of the region as 0 when a product of an average of the gradient values and the threshold values is less than or equal to the gradient value of the region.

9. The image processing device of claim 1, wherein the gradient value manager is configured to maintain unchanged a gradient value of the region when a product of an average of the gradient values and the threshold values is greater than the gradient value of the region.

10. An image processing system, comprising:
an image sensor configured to determine pixel values including phase information and brightness information of an image based on light received from outside; and
an image processing device configured to obtain depth information of the image based on the pixel values received from the image sensor,
wherein the image sensor includes microlenses, each of the microlenses corresponding to n square pixels, where n is an integer of two or more, and
wherein the image processing device comprises:
a data group generator configured to determine data groups based on target pixel values, which correspond to a range determined according to the phase information, among the pixel values;
a gradient value manager configured to determine gradient values of a region corresponding to the target pixel values and determine gradient information by applying threshold values, which are determined according to the target pixel values, to the gradient values; and
a cost volume manager configured to determine a cost volume by weighted summing the data groups based on the gradient information and determine the depth information based on the cost volume.

11. The image processing system of claim 10, wherein the data group generator is configured to determine averages of the target pixel values in a horizontal direction and averages of the target pixel values in a vertical direction, determines a first data group with respect to a horizontal direction of the image based on the averages of the target pixel values in the horizontal direction, and determines a second data group with respect to a vertical direction of the image based on the averages of the target pixel values in the vertical direction.

12. The image processing system of claim 11, wherein the data group generator is configured to determine the first data group by comparing a first reference value selected from among the averages of the target pixel values in the horizontal direction with the averages of the target pixel values in the horizontal direction in a predetermined range and determine the second data group by comparing a second reference value selected from among the averages of the target pixel values in the vertical direction with the averages of the target pixel values in the vertical direction in the predetermined range.

13. The image processing system of claim 11, wherein the gradient value manager is configured to determine gradient values in a horizontal direction and gradient values in a vertical direction of the region corresponding to the target pixel values and determine first gradient information by applying the threshold values to the gradient values in the horizontal direction and second gradient information by applying the threshold values to the gradient values in the vertical direction.

14. The image processing system of claim 13, wherein the cost volume manager is configured to deter mine the cost volume using an average of the first data group that is weighted based on the first gradient information and the second data group that is weighted based on the second gradient information.

15. An image processing method, comprising:
receiving pixel values including brightness information and phase information of an image from outside;
determining data groups based on target pixel values, which correspond to a range determined according to the phase information;
calculating gradient values of a region corresponding to the target pixel values and determining gradient information by applying threshold values, which are determined according to the target pixel values, to the gradient values; and
determining a cost volume by weighted summing the data groups based on the gradient information.

16. The image processing method of claim 15, wherein determining the data groups comprises:
determining a first data group with respect to a horizontal direction of the image based on the target pixel values; and
determining a second data group with respect to a vertical direction of the image based on the target pixel values.

17. The image processing method of claim 16, wherein generating the first data group comprises:
determining averages of the target pixel values in a horizontal direction;
selecting a first reference value from among the averages of the target pixel values in the horizontal direction; and
determining the first data group by comparing the first reference value with the averages of the target pixel values in the horizontal direction in a predetermined range.

18. The image processing method of claim 16, wherein determining the second data group comprises:
calculating averages of the target pixel values in a vertical direction;
selecting a second reference value from among the averages of the target pixel values in the vertical direction; and
determining the second data group by comparing the second reference value with the averages of the target pixel values in the vertical direction in a predetermined range.

19. The image processing method of claim 16, wherein determining the gradient information comprises:
determining gradient values in a horizontal direction and gradient values in a vertical direction of the region corresponding to the target pixel values; and
determining first gradient information by applying the threshold values to the gradient values in the horizontal direction and second gradient information by applying the threshold values to the gradient values in the vertical direction.

20. The image processing method of claim 19, further comprising determining depth information of the image based on the cost volume,
wherein determining the cost volume comprises calculating the cost volume using an average of the first data group that is weighted based on the first gradient information and the second data group that is weighted based on the second gradient information.

* * * * *